United States Patent [19]
Roe

[11] 3,749,930
[45] July 31, 1973

[54] VEHICLE THEFT SECURITY SYSTEM
[76] Inventor: Bruce Roe, P. O. Box 253, Naperville, Ill.
[22] Filed: Mar. 8, 1971
[21] Appl. No.: 121,845

[52] U.S. Cl. ............ 307/10 AT, 317/134, 180/114, 340/64
[51] Int. Cl............................................. H02g 3/00
[58] Field of Search ............... 307/10 AT; 317/134; 180/114; 340/64; 200/44, 46, 42

[56] References Cited
UNITED STATES PATENTS

| | | |
|---|---|---|
| 3,415,087 | 12/1968 | Kramasz, Jr. et al. ............ 200/44 X |
| 3,611,287 | 10/1971 | Hoff .............................. 307/10 AT |
| 3,634,880 | 1/1972 | Hawkins .............................. 200/46 |
| 3,576,536 | 4/1971 | Wolfe .................................. 317/134 |

*Primary Examiner*—Herman J. Hohauser
*Attorney*—Peter Visserman

[57] ABSTRACT

An electronic control system for the starter motor of a vehicle which includes a novel key-controlled means actuable to energize a series of gates that control the flow of electrical current from the ignition switch through related components to the starter motor switch. The system also includes lock means enabling one to render the electrical system operable in selected instances when the key is removed.

9 Claims, 6 Drawing Figures

PATENTED JUL 31 1973
3,749,930
SHEET 1 OF 3
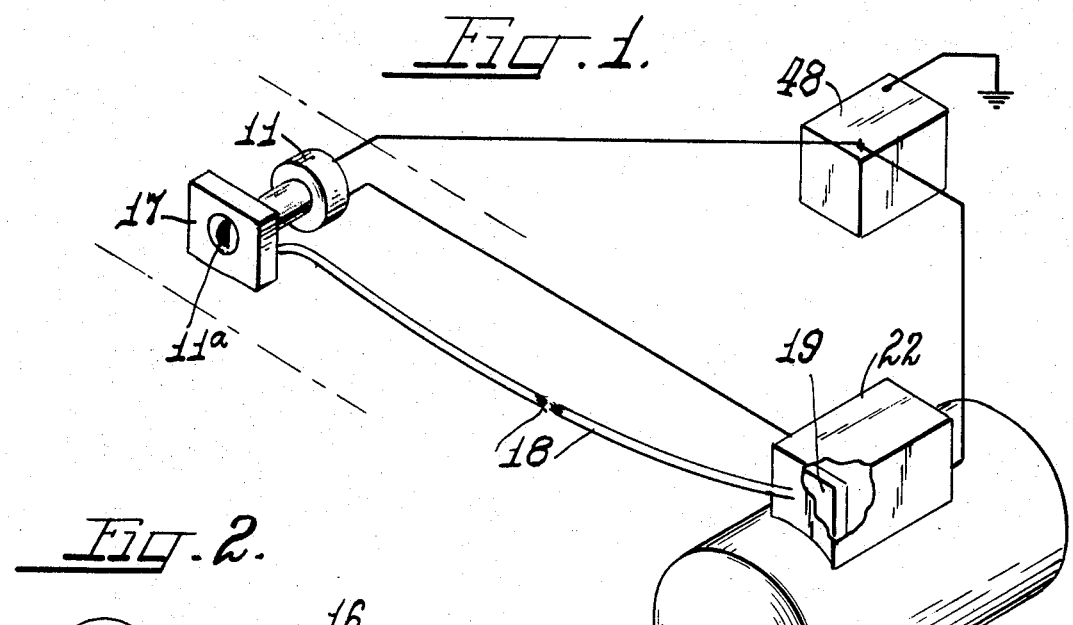
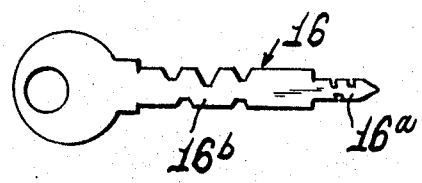
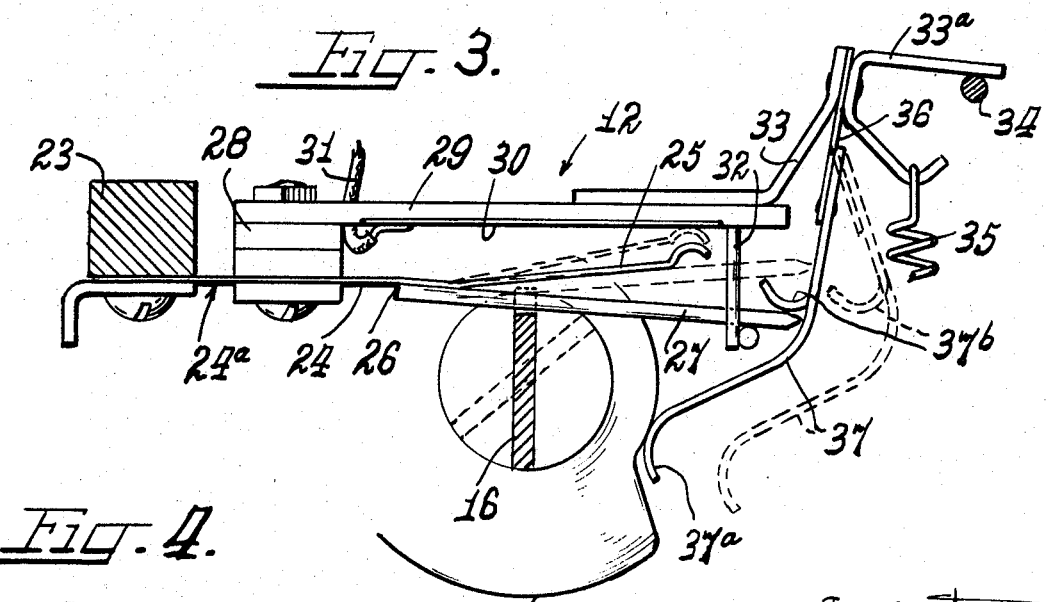
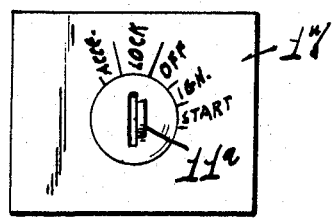
Inventor
Bruce Roe.
Elmer L. Guiskel
Atty.

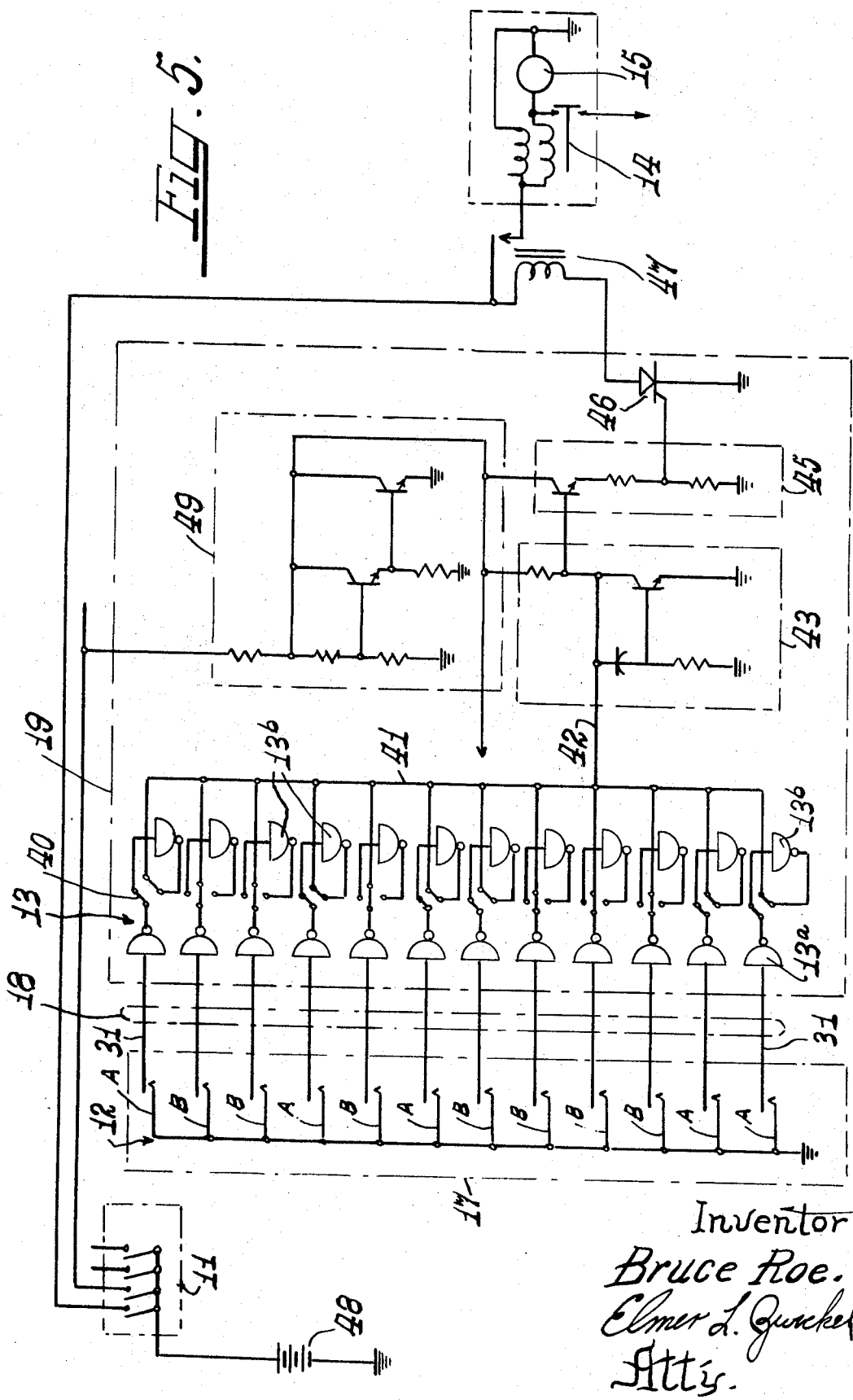

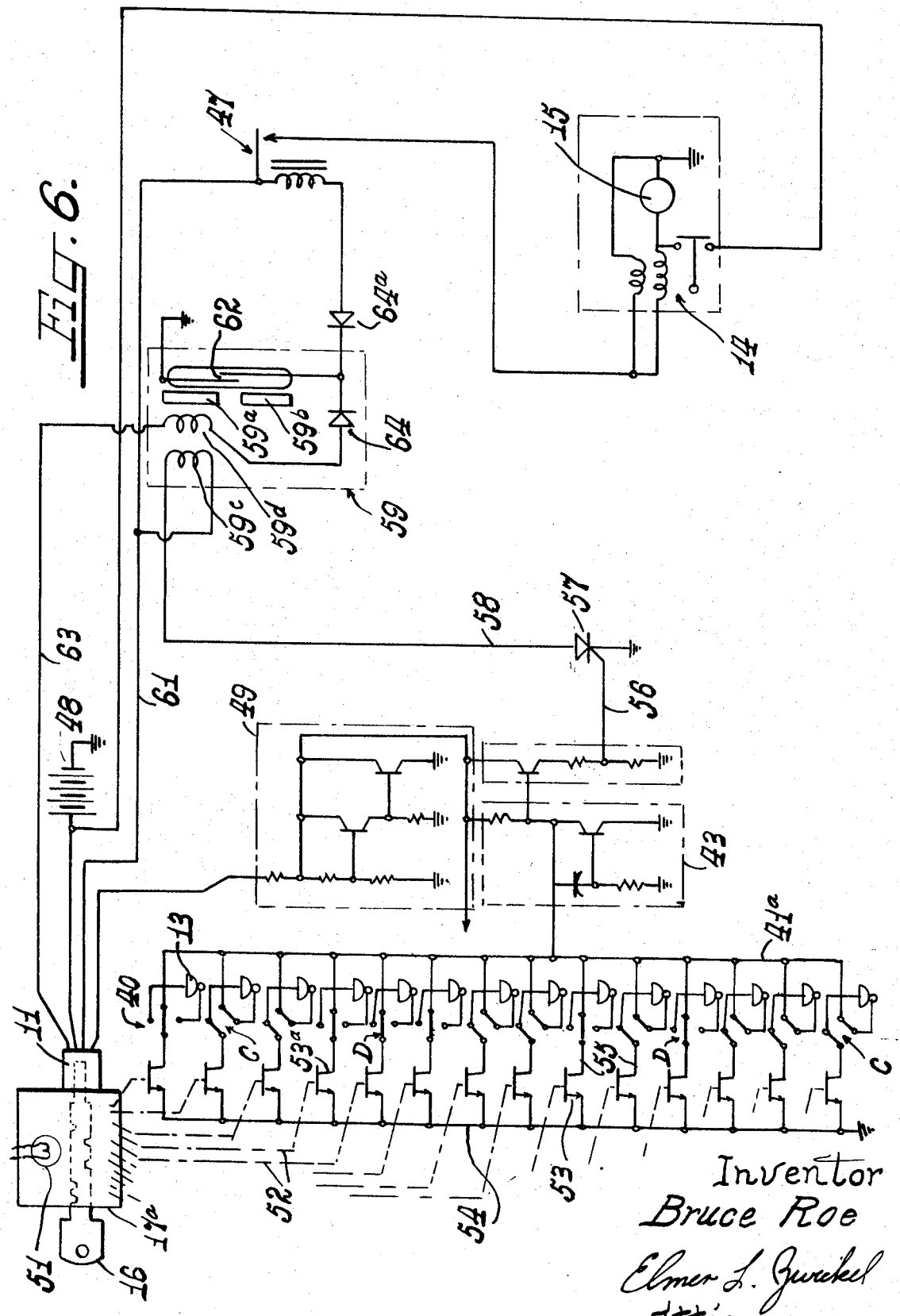

VEHICLE THEFT SECURITY SYSTEM

The invention, herein disclosed in two embodiments, relates to improvements in means and apparatus for locking a motor vehicle, or the like, against wrongful closing of the electric circuit to the starter motor switch. More specifically, the device is such that when the ignition key is turned to "on" position, an electronic "lock" circuit connected in the starter switch circuit is brought into operation. The circuitry includes, in the present disclosures 12 switches, or 14 light tubes. When select switches are closed or select light tubes are activated by a key given characteristics, associated "gates" are activated and the electric circuit to the starter motor switch is closed. In the preferred embodiment disclosed, should any one of these select switches remain "open" or should any non-selected switch be "closed," the correct combination of switches is absent and the starter motor switch will remain open. Similarily, should any one of the several selected light tubes be not activated, or should a non-selected light tube be activated, the starter motor switch will remain open.

The system also includes means whereby the select switches can be positioned and locked in closed condition or select light tubes activated, and the key withdrawn from the ignition lock so as to enable a parking attendant to move and park the vehicle. Preferably, the lock circuit and its components will be enclosed in a housing secured to the starter motor housing and made unavailable for tampering without removal of the starter motor from the vehicle. Of course, other locations, difficult of access, can be used and the circuitry can be connected into the circuit to the ignition points or a fuel line. It might be noted also, that all wiring from the ignition switch, other than the starter switch lead, is conventional.

The preferred use of switches or light tubes and a coded key with suitably coded notches allows the owner to insert the key in the ignition switch and upon turning same "on" transmit the entire code to the respective switches or light tubes, closing some switches and activating some light tubes, to cause a "high" electrical current to be delivered to the starter motor switch. By judicious coding of the key notches and switches or light tubes, it is possible to provide many possible code combinations. In the present disclosure of 12 switches a total of 4,096 switch combinations are possible. Thus, a potential thief would require 4,096 keys only one of which will start the vehicle. Should a potential thief actually splice into the twelve wire cable and use an electronic device to rapidly count through all possible combinations, a time delay incorporated into the system would require him to dwell about 1 second on each count thus consuming about 1 hour's time to select the correct coded combination. When 14 light tubes are used, it is possible to have 16,384 coded combinations. Of course, more or less switches or light tubes can be provided depending upon the security desired.

It is therefore an object of the invention to provide an anti-theft vehicle locking system of the character referred to.

Another object is to provide an ignition switch with a multiplicity of key reader devices.

Another object is to provide an ignition system with a novel combination of switches selectively actuable to close the circuit to the switch of a starter motor of a vehicle in response to insertion into the ignition switch of a coded key.

Another object is to provide an ignition system with a novel combination of light sensitive devices selectively rendered effective upon insertion into the ignition switch of a coded key.

Another object is to provide a novel electronic lock system.

Another object is to provide novel switches.

Other objects and advantages of the invention will become apparent with reference to the following description and accompanying drawings.

In the drawings:

FIG. 1 is a schematic of an ignition-starter motor control system.

FIG. 2 is a view of a representative key.

FIG. 3 is a detail view of one of a plurality of like switches.

FIG. 4 is a front elevational view of the ignition lock assembly.

FIG. 5 is a schematic of the electric circuitry.

FIG. 6 is a schematic of a modified system.

The electronic lock system disclosed in the exemplary form of the invention as shown in FIGS. 1 to 5 in the accompanying drawings, comprises an ignition switch 11 having associated with it a bank of key reader switches 12 and associated electronic lock 13, one for each reader switch. This assemblage is electrically connected to the starter switch 14 on a starter motor 15. A key 16, having a terminal portion 16a, for engagement with the ignition switch, and a main body portion 16b having any selected coded notch combinations thereon is provided for insertion into the ignition switch.

Referring to FIG. 1, the ignition switch 11 has arranged on its front side a casing 17 which, as shown in FIG. 5, encloses a select number of key reader switches 12 (in this disclosure there are 12 reader switches) which are electrically connected, as by multiple wire cable 18, one to each of the electronic locks 13. As shown in FIG. 5 these locks 13 are enclosed in a housing 19 that preferably is mounted directly on the housing of the starter motor 21 (FIG. 1) and it and other associated parts to be described presently, are all encased in a casing 22 secured firmly to the starter motor housing.

Before entering into a discussion of the operational sequence of the elements, a detail description of the structure and function of each key reader switch 12 and the ignition switch 11 is advisable. The ignition switch 11 (FIG. 4) has a finger piece 11a extending from its barrel and which may be turned to turn on or shut off the ignition switch. However, the starter will not operate unless the key 16 is first used to pre-set the key reader switches. As noted hereinabove there are twelve key reader switches preferably arranged in two banks of six each, six on one side of the ignition switch assembly and six on the opposed side of said assembly. In the FIG. 3 disclosure only one such switch is shown, it being understood that the remaining 11 are identical in structure and function.

As there illustrated, (FIG. 4) the ignition lock 11 barrel assembly is shown with a key 16 positioned therein. This key has coded notches 16b which actuate the usual tumblers to afford means to cause a switch 12 to remain open or to be closed when the key is turned in the lock. The position of the switch shown is open because a key notch 16b is in register therewith.

The assemblage of switches in each bank of switches is mounted firmly at one end on a rigid grounded mounting bar 23, and each switch includes a flexible brass strip 24 that terminates at its free end in a contact portion 25. Intermediate it length there is secured, as at 26, one end of a lift bar 27 that is engageable by the key. Rearwardly of the juncture 26 is a bracket 28 mounting firmly one end of a printed circuit board 29, common to all of the switches in the bank, having contact strips 30, one for each switch in the bank, disposed for contact by the respective contact portion 25. Wire leads 31, in cable 18, connected one to each electric lock 13, are connected one to each contact strip 30.

The printed board 29 has a depending yoke 32 adjacent its free end that underlies and supports the lift bars 27 in their lowered position. Said board 29 carries on its forward free end a bracket 33 having a forward projection 33a that normally rests on a stop pin 34 to limit downward flexing of the switch assembly. Said assembly is held against said pin by a pull spring 35. The bracket 33 carries a depending spring bar 36 that mounts on its lower end a key feeler latch 37 having a tail portion 37a that is urged at all times against the peripheral surface of a cam 38 carried by the ignition switch barrel. The latch 37 also has a dog ear 37b extending in the direction of the lift bars 27.

Now when the key 16 is inserted into the ignition lock barrel and no notch is located under the lift bar 27, said lift bar is raised when the barrel is rotated into the elevated position shown in dotted lines, closing the circuit between the contact portion 25 and its related contact strip 30. Turning of the key to rotate the ignition lock barrel withdraws the cam 38 from the path of the latch tail portion 37a, permitting the feeler latch 37 to swing toward the switch assembly and locate its dog ear 37b between the elevated and not elevated switch bars 27 to hold all of said bars in their intended positions. For the purposes of this description the key will position all of the switches in their intended positions, some open and some closed, depending upon the coding of the notches therein.

It should be noted that when the lift bars 27 are locked, as aforesaid, the key may be withdrawn and reinstated without altering the position of the locked lift bars. This is because as the key is inserted or withdrawn the high spots thereon will cause the entire switch assembly to flex upwardly at 24a relative to the mounting bar 23, lifting the free end off stop pin 34. Thus, the key may be removed and the switch mechanism remains in its set position and the car motor can be started or stopped by manually engaging and turning the finger piece 11a (FIGS. 1 and 4) projecting through the code reader 17 from the ignition lock barrel. However, upon reinsertion of the key and its rotation back to "off" position, the cam 38 moves under the tail portion 37a to withdraw the dog ear 37b from between the lift bars 27 and when the key is now removed all of said bars will return to their "off" positions and the ignition is locked.

As previously noted, the switches 12 are connected by the multi-wired cable 18 (leads 31) to the electronic locks 13, one provided for each switch. The locks comprise 24 gates arranged in pairs, 12 of which are numbered 13a and the other 12 13b. As is well understood, the output of a gate will assume the opposite state of its input. Thus, if the input is "low" the output will be "high," and vice versa. The gates 13a have a "high" output voltage of about 4 volts when the input is driven "low" by being grounded by a closed key reader switch 12. The output of a gate 13b will be "high" if the input is driven "low" by a gate 13a which requires an open switch 12 driving the input of 13a.

Some of the gates 13a and 13b are connected in series by jumpers 40 whereas others are disconnected. When a key reader contact, for example key switch 12, marked A, is open, the output of its gate 13a goes "low," thus driving its series connected gate 13b to a "high" output. When said switch 12A is closed the output from its gate 13b is "low." Similarily, when a switch 12, such as that indicated at B is closed, the output from its gate 13a is "high." Thus, contact switches B must be closed to obtain a "high" output from their gates 13a.

Because the output line 41 must go "high" to function it is necessary that all switches responding to A must be open and all switches responding to B must be closed to obtain a "high" voltage in line 41. Should the position of any one of these switches be reversed the voltage in line 41 will go "low" and the circuitry to the starter motor will be inactive. It is apparent therefore, that upon judicious coding of the jumpers 40 between gates 13a and 13b many combinations may be provided. The lead 41 is connected by lead 42 to a conventional delay action circuit 43.

In operation, the lead 41 must go "high" to actuate the connecting components, including the delay action circuit 43. Thus, when a proper combination of gates is selected by the presence or absence of notches in the key, the lead 41 will be "high." For example, in the FIG. 5 illustration, with switches A open and their gates 13a driving through gates 13b, the output to line 41 is "high" and with all of the remaining switches B closed, their output to line 41 will be "high" and the control system will be activated after a delay of about 1 second. Should any of the switches A, in the key reader 12, be closed, or any of the switches B be open by reason of the notches in the manual key 16, the output in line 41 will go "low" and no electrical function takes place.

Specifically, when the lead 41 goes "high," the current flows through the delay action circuit 43 to an emitter follower circuit 45 for actuating a silicon controlled rectifier 46 which in turn closes a relay 47 to complete the circuit from the ignition to the starter motor 15. Power is supplied to the circuit from a battery 48 through a voltage regulator 49.

In the FIG. 6 disclosure, there is illustrated a modified form of the control system wherein optic light tubes and related components are utilized to effect desired locking control of the starter motor switch. The structure functions to the same end as the circuitry previously described and like numerals are used to identify corresponding parts.

Specifically, the ignition lock 11 has associated with it a casing 17a containing a light source 51 located on one side of a key 16 inserted thereinto and a plurality of glass fiber optic tubes 52 (here 14 in number) on the other side of the key, any one or more of which will be illuminated when a notch or notches is present in the key. The light passes through the notch or notches to the related tube. As before, the key notches will be coded with the jumpers 40 that connect or do not connect a gate 13 in the circuitry. The remainder of the mechanism is again located in a secure section of the vehicle drive train such as the starter motor. Connections from casing 17a are made via wires and the optic tubes 52.

The "bundle" of optic tubes 52 has its tubes connected one to each of a series of photo transistors 53 which are grounded through a common lead 54 and are connected by leads 55 to a terminal on a coding jumper 40. The code jumpers "D" by-pass their associated gates 13. The jumpers are all connected to a high output line 41a which leads to the time delay circuit 43.

In use, insofar as the circuitry has been described, when a notched key 16 is inserted in the ignition lock, light beams pass through aligned notches to supply energy to the photo transistors 53. For the output line 41a to go "high" the photo transistors 53D must remain dark. That is, there is no key notch in register with its related optic tube 52. Simultaneously, the notches in the key register with the remaining tubes leading to their photo transistors 53C. With this coding, the output line 41 is "high." By varying the jumper (40) positions and effecting a corresponding variation in the coded notches in the key, a multitude of combinations can be set up. In the present disclosure of 14 optic tubes and related parts, it is possible to set up 16 384 combinations.

When the output in line 41 is "high" current flows through the time delay circuit 43 through a line 56 to the SCR 57 and through lead 58 to a conventional reed switch 59. As is well understood, if the reed switch magnetic strip 59a is magnetized in the same direction as its permanent magnet 59b, the magnets attract each other. Thus, when the SCR 57 fires current flows from the starter lead 61 through coil 59c, magnetizing the magnetic strip 59a in a direction to close the reed switch contacts 62. Current will now flow through a relay coil 47 applying current to the starter switch 14 so long as the lead 61 supplies current. The reed switch will stay closed because of the influence of the magnetic strip 59a even after all power is removed. Now, with the ignition switch in the "off" position, the key can be removed and the switch can be actuated by turning the handle 11a so that the car can be operated by an attendant as previously described.

When the key is in the ignition switch, said switch may be turned to the "lock" position. This applies power through the lock lead 63 to the reed switch 59. Current will now flow through coil 59d, diode 64 to the reed switch contacts 62, magnetizing the contact strip 59a in the opposite direction thus opening the switch contacts 62 to stop flow of current to the relay 47. The diodes 64 and 64a prevent reverse current flow.

Although I have described preferred embodiments of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. A security system for a motor vehicle comprising: solenoid means for selectively allowing and preventing operation of said motor vehicle; a plurality of electrical switches each having a conducting and non-conducting state; key actuated control means for selectively placing said switches in said conducting and non-conducting states; electronic lock means connected to said plurality of switches and having an output conductor, and being responsive to specified ones of said switches being in the non-conducting state and others of said switches being in the conducting state to generate output signals on said output conductor for operating said solenoid.

2. The system in accordance with claim 1 and further comprising delay means connected to said output conductor for allowing said solenoid to be operated only after said specified ones of said switches and said others of said switches have been in the non-conducting and conducting states, respectively, for a predetermined period of time.

3. The system in accordance with claim 1 and wherein said electronic look means comprises a plurality of gate circuits, each having an input terminal connectable to one of said plurality of switches and an output terminal connectable to said output conductor.

4. The system in accordance with claim 1 wherein each of said switches comprises a photo sensitive device, and wherein said key actuated control means comprises a source of photo electric energy and means for selectively transmitting photo electric energy to said switches.

5. The system in accordance with claim 1 and further comprising switch means responsive to signals on said output conductor to latch in a first state for allowing electrical current to be applied to said solenoid, and responsive to signals from said key actuated control means to assume a second state for inhibiting the flow of electrical current to said solenoid.

6. The system in accordance with claim 1 wherein said switches comprise electrical contracts having open and closed states, and said system further comprises buffer gate circuits connected to each of said switches, whereby the system's input impedance measured from said switches remains uniform irrespective of circuit inter-connections internal to the system.

7. An electronic security system for a motor vehicle comprising:
a plurality of first and second inverter gate circuits each having an input terminal and an output terminal and responsive to the application of a low input signal to the input terminal to generate a high output signal on the output terminal;
a corresponding plurality of switches for selectively applying a low potential signal to the input terminal of the first inverter gate circuit of said pairs of gate circuits;
signal conductor means;
means for selectively connecting the output terminal of the first inverter gate circuit of each of said pairs to the input terminal of the corresponding second inverter gate circuit and to the signal conductor means;
means for selectively connecting the output terminal of the second inverter gate circuits to the signal conductor means; and
control circuit means connected to said conductor means for allowing operation of the motor vehicle only in the presence of a high potential signal on the signal conductor means.

8. The system in accordance with claim 7, wherein the control circuit means comprises delay circuit means and the control circuit means allows operation of the vehicle only after the sustained presence of the high potential on the signal conductor means for a predetermined period of time.

9. The system in accordance with claim 7 wherein the control circuit means comprises an electrical solenoid and switch means responsive to the high potential on the signal conductor means for controlling current flow through the solenoid.

* * * * *